United States Patent [19]

Gillett et al.

[11] Patent Number: 4,893,479
[45] Date of Patent: Jan. 16, 1990

[54] COMPRESSOR DRIVE SYSTEM

[75] Inventors: Jimmie D. Gillett, Garland; Richard R. Garcia, Plano; Charles B. Ingram, Coppell, all of Tex.

[73] Assignee: Ranco Electronics Division, Irving, Tex.

[21] Appl. No.: 222,325

[22] Filed: Jul. 20, 1988

Related U.S. Application Data

[63] Continuation of Ser. No. 28,309, Mar. 20, 1987, abandoned.

[51] Int. Cl.[4] ............................................. H02P 5/28
[52] U.S. Cl. ...................................... 62/213; 62/228.4; 318/806; 318/807
[58] Field of Search ................... 62/228.3, 228.4, 229, 62/213, 226, 227; 417/45; 318/806, 807, 334

[56] References Cited

U.S. PATENT DOCUMENTS

| | | | |
|---|---|---|---|
| 3,409,817 | 11/1968 | Gillett | 321/5 |
| 3,704,403 | 11/1972 | Gillett | 318/227 |
| 3,748,556 | 7/1973 | Gillett | 318/227 |
| 3,919,610 | 11/1975 | Gillett | 318/231 |
| 4,441,062 | 4/1984 | Evans et al. | 318/703 |
| 4,447,867 | 5/1984 | Evans et al. | 363/56 |
| 4,458,199 | 7/1984 | Evans et al. | 323/286 |
| 4,563,624 | 1/1986 | Yu | 318/334 X |
| 4,618,810 | 10/1986 | Hagerman et al. | 318/803 |
| 4,689,543 | 8/1987 | Hucker | 318/806 X |

Primary Examiner—William E. Wayner
Attorney, Agent, or Firm—Watts, Hoffmann, Fisher & Heinke

[57] ABSTRACT

A compressor drive system that includes a thermostat producing a signal indicating the measured air temperature, a modulation control circuit connected to the thermostat to produce a motor drive signal from the temperature signal and which is output to a motor drive switching bridge circuit. The motor drive switching bridge circuit is connected to a rectifier that converts single phase alternating current to direct current. The switching bridge uses the motor drive signal from the modulation control circuit and the rectifier output to produce multiphase power including a speed control signal imposed on the power for regulating speed. A motor connected to drive a compressor is included. The motor is powered by the motor drive switching bridge circuit multiphase power output. The speed of the motor is controlled as a function of the temperature signal.

16 Claims, 6 Drawing Sheets

COMPRESSOR DRIVE SYSTEM

This is a continuation of Ser. No. 028,309, filed 3/20/87, now abandoned.

BACKGROUND

1. Field of the Invention

This invention relates to air conditioning systems and heat pump systems and more specifically to an apparatus for operating the compressor.

2. Discussion of the Prior Art

An air conditioning system consists of a motor drive connected to a compressor which pressurizes a refrigerant gas for transfer through suitable piping to a refrigeration coil where the pressurized refrigerant gas is depressurized resulting in cooling. A heat pump includes the same general components but operates in reverse. In the air conditioner, the depressurized gas is returned to the compressor for repressurization. A blower is connected to circulate air about the refrigeration coil so that the cooling effect of the refrigeration coil cools the air from the blower. Ducting is included to direct the air into an area to be cooled. Customarily, the ducting includes a return air flow path to take warm air from this area so that it may be transferred by the blower about the refrigeration coil for cooling and then back to the area to be cooled.

Currently, residential air conditioners include an electric motor connected to the compressor to power the compressor. Customarily, this electric motor is a single phase 230V 60 Hz alternating current motor that operates at one or two speeds to drive the compressor. In operation, when the thermostat located in the area to be cooled indicates that additional cooling is required, a signal from the thermostat initiates the compressor motor to begin the air conditioning operation. When the cooling has resulted in a lower temperature in the area to be cooled, the thermostat indicates the occurrence of this second cooler temperature by removing the signal from the compressor causing the air conditioner to stop. The starting and stopping of the air conditioner compressor not only results in shorter lifetime for the compressor but results in an inefficient use of electric energy by the motor. The compressors include oil circulation to reduce friction and wear on internal components. However, when the compressor is first started, the oil has not had time to properly circulate resulting in excessive wear during the start-up period effecting the compressor reliability. By increasing the number of speeds of the motor to two speeds, the compressor reliability and energy efficiency are improved somewhat but still compressor starts and stops occur.

It is an object of the present invention to provide an air conditioner/heat pump compressor drive system that drives the compressor at a variable speed in accordance with the cooling or heating requirements.

It is a further object of the present invention to provide the conversion of power from single phase to multiphase at a variable frequency to improve the electric motor performance.

SUMMARY OF THE INVENTION

In accordance with the present invention a compressor drive system is disclosed that includes a rectifier to convert externally supplied single phase alternating current into direct current, a temperature sensor for producing a signal indicative of the ambient air temperature of an area to be either cooled or heated and modulation control circuitry connected to receive the temperature signal. The modulation control circuit produces multiphase power and speed control signals which are input to a motor drive switching bridge circuit that modulates the rectifier output in accordance with the multiphase power and speed control signals to produce a multiphase power output at a frequency and voltage that vary in accordance with the temperature signal. This power output is connected to the motor which drives the compressor at a speed in accordance with the temperature signal.

In a preferred embodiment of the invention the compressor drive system is disclosed with a current limiting circuit within the modulation control circuit. The current limiting circuit is connected to the rectifier to detect the current output from the rectifier. This current output is used by the modulation control circuit to regulate the speed control and multiphase power signals. Also in this embodiment, a voltage regulation circuit is included in the modulation control circuit. The voltage regulation circuit is connected across the output of the rectifier and regulates the speed control signal in accordance with the voltage output from the rectifier. The modulation control circuit also includes a fault detection circuit that inhibits the production of the multiphase power and speed control signals in the presence of certain fault conditions. In this embodiment, the fault detection circuit includes a latch which is set upon the occurrence of the fault condition resulting in the inhibiting of the output of the multiphase power and speed control signals. This latch can be reset externally.

In another preferred embodiment, an air conditioner is disclosed that includes a compressor for pressurizing a refrigeration gas and a refrigeration coil connected to the compressor for depressurizing the refrigeration gas to provide cooling. The blower is included for circulating the air through the refrigeration coil and into an area to be cooled. A temperature sensor is provided in the area to be cooled to sense the ambient air temperature and to provide a signal indicative thereof. A rectifier for converting externally supplied single phase alternating current into direct current is provided and is connected to a motor drive switching bridge circuit. A control voltage circuit that is connected to receive the temperature signal and connected to receive a signal indicating the rectifier current output is provided to produce a motor speed signal in response thereto. A reference voltage circuit is included to receive the motor speed signal and a reference voltage signal from the rectifier means that indicates the output voltage across the rectifier. The reference voltage circuit provides a modified motor speed signal in response to the motor speed signal and reference voltage signal. An oscillator circuit is provided that receives the motor speed signal from the control voltage circuit and produces a first and second waveform signals in response to the motor speed signal. A frequency modulation circuit is included that receives the first waveform from the oscillator and produces a third waveform and multiphase power signals. A comparator is connected to receive the second waveform from the oscillator and the third waveform from the frequency modulation circuit and the modified motor speed signal from the reference voltage circuit and produces a speed control waveform signal. A modulation circuit is connected to combine the multiphase power signals from the frequency modulation circuit and the speed control waveform from the comparator to produce multiphase modulated power control signals which are input to the motor drive switching bridge together with the output from the rectifier. The motor drive switching bridge produces a multiphase power output in accordance with the multiphase modulated power control signals. In this embodiment, fault detection circuitry is included connected to the rectifier and the motor drive switching bridge for shutting down the multiphase power production upon the occurrence of a fault condition. The output of the motor drive switching bridge circuit is connected to the motor such that the motor drive switching bridge circuit provides a multiphase power to the motor to drive a compressor of the air conditioner at a speed in accordance with the speed control waveform signal.

BRIEF DESCRIPTION OF THE DRAWINGS

The novel features believed to be characteristic of the invention are set forth in the claims. The invention itself, however, as well as other features and advantages thereof will be best understood by reference to detailed descriptions that follow when read in conjunction with the accompanying drawings, wherein:

DETAILED DESCRIPTION OF THE PREFERRED EMBODIMENT

The present invention is disclosed as an air conditioning system but should understood to include a air conditioner on heat pump system.

As previously discussed, an object of the invention is to provide a variable speed drive capability for the compressor wherein the speed is determined by the cooling (or heating in the case of a heat pump) requirements. To provide speed control, the invention includes a conversion of externally provided single phase 230V 60 Hz alternating current power to a direct current which is modified to three phase power in a manner to power and control the speed of the compressor drive motor. The production of three phase power is traditionally accomplished by an inverter. Of the several classes of inverters, the pseudo square wave and pulse width modulated converters are of interest here. The inverter, control circuitry together with a rectifier and a temperature sensing device provide the regulated compressor drive power. The result is that the variable speed motor drives the compressor in a manner to vary the amounts of freon pressurized resulting in more efficient cooling and/or heating as required.

In the preferred embodiment, a constant torque electric motor is used to drive the compressor. The power supplied to the constant torque motor varies as to the power frequency and as to the power voltage in order to vary the motor speed. Since torque is proportional to flux and flux is proportional to frequency and voltage, decreasing the frequency and the voltage to the constant torque motor will decrease the motor speed. In this embodiment, the motor is a constant torque motor within a frequency range of 6 to 60 Hz since the power voltage will be varied as the power frequency is varied within this power frequency range. From 60 Hz to 90 Hz, the power voltage is constant at 230V resulting in the motor producing a constant horsepower output over this power frequency range. Therefore, by varying the power frequency and, to some extent, the power voltage simultaneously, the motor speed becomes controllable resulting in the control of the air conditioner compressor and the corresponding cooling capability of the system. The variable cooling capacity results in an improved operation of the compressor since the compressor will be running almost all of the time, reducing the start-up oil circulation problems which effect compressor reliability. Additionally, the constant running of the electric motor reduces the motor start-ups resulting in an increased motor energy efficiency. Still further, the availability of three phase power enables a smaller three phase motor to replace the traditional larger single phase motor for the same total power output.

Figure 1:
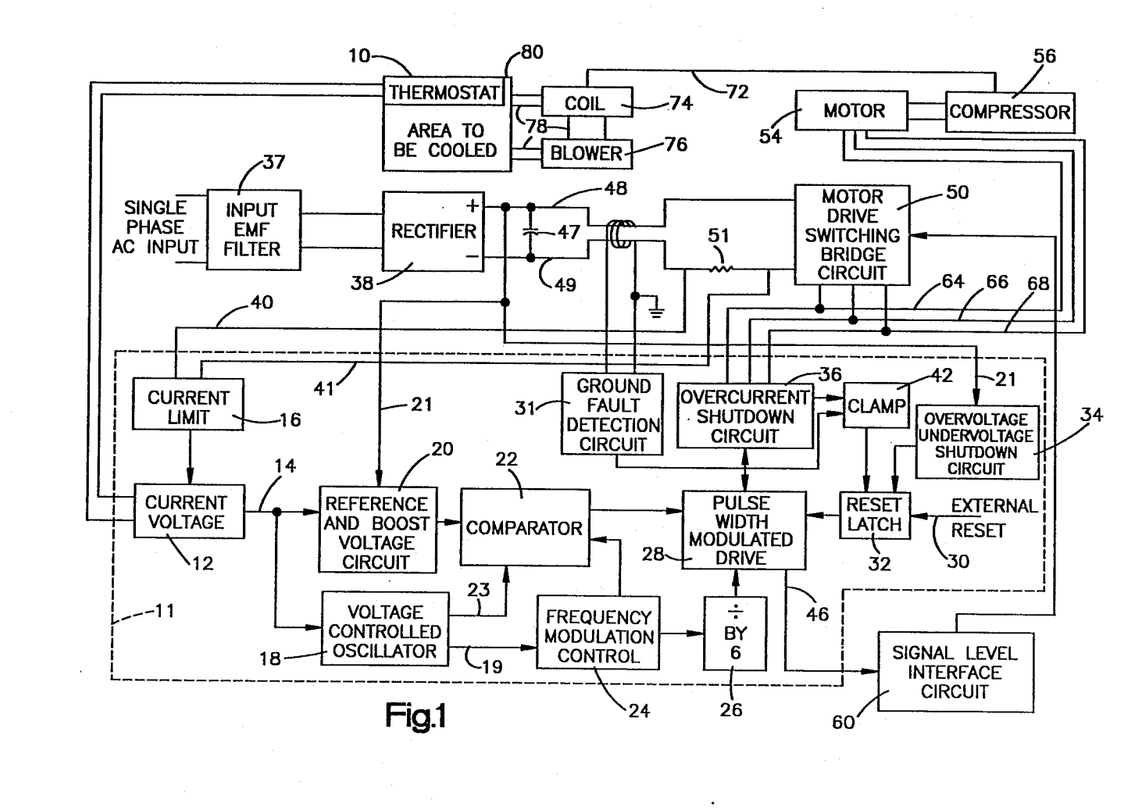
FIG. 1 is a block diagram illustrating the functional components of the air conditioning system.

FIG. 1 is a block diagram illustrating the functional components of the air conditioning system invention. The controlling input of the system is the area 80 ambient air temperature which is measured by thermostat 10, which in the preferred embodiment includes a thermocouple to measure temperature, and input to voltage control circuit 12 which produces a corresponding control voltage on line 14. The magnitude of this control voltage is a direct function of the input temperature to thermostat 10. The control voltage on line 14 is input into a voltage controlled oscillator 18 together with the output of a current limit circuit 16 that is connected by lines 40 and 41 to a resistor 51 to measure the current output of the rectifier 38. The output of the voltage control circuit 12 is also input to a reference and boost voltage circuit 20. Circuit 20 serves three purposes. The first being to provide a boost voltage when the motor is first turned on in order that enough initial voltage may be supplied to initiate the signal to start the motor. The second function of circuit 20 is to regulate the voltage to the motor in accordance with a voltage input from the rectifier on line 21 which is the rectifier output voltage. Thirdly, the circuit 20 provides the reference voltage output to comparator 22 that is used with the output on line 23 of the voltage control oscillator 18 to provide a speed control signal to the pulse width modulator drive circuitry 28. Additionally, the output of the voltage control oscillator 18 is provided on line 19 to the frequency modulation control circuit 24 which is input to a divide by 6 circuit 26 to provide the three phase output reference signals to the pulse width modulated drive circuitry 28. The pulse width modulated drive circuitry 28 combines the signals from the divide by 6 circuitry 26 and the comparator 22 to produce the signals on line 46 for controlling the motor drive switching bridge 50 which provides three phase power to a motor. The output on line 46 is input through an interface circuit 60 to provide the appropriate voltage levels on line 62 to switch the bridge circuit 50. The signals output from the pulse width modulated drive circuit 28 control the power output from the motor drive switching bridge circuit 50 and regulate the speed of motor 54.

The system further includes an overvoltage/undervoltage shutdown circuit 34 connected to measure the voltage output of the rectifier 38, an overcurrent shutdown circuit 36 connected to measure current to the motor 54 on lines 64, 66 and 68, ground fault detection across the rectifier 38 via circuit 31 all which are input to a clamp 42 that sets reset latch 32 when a fault occurs. The reset latch 32 also includes an external reset signal 30 that can be used to reset the latch to restart the system after a shutdown.

The overvoltage/undervoltage shutdown circuit 34 receives a signal indicating the rectifier voltage output as an input on line 21 from the rectifier 38. Upon detecting an undervoltage or an overvoltage condition, the circuit 34 will provide an output to reset latch 32 causing the latch to set and in turn providing a signal to the pulse width modulated drive circuitry 28 which inhibits any output on line 46 resulting in motor 54 being shutdown.

The overcurrent shutdown circuitry 36 measures the current output from the bridge circuit 50 on lines 64, 66 and 68 and provides an output to the reset latch 32 through clamp 42 when an overcurrent condition is detected causing the latch 32 to be set providing an output to the pulse width modulated drive circuitry 28 inhibiting its output on line 26 resulting in motor 54 being shutdown.

Ground fault detection circuit 31 is connected by a coil across the output of rectifier 38 to detect a ground fault condition. The output of circuit 31 is provided to clamp 42 to set the reset latch 32 upon the occurrence of a ground fault condition. The output of latch 32 will then inhibit the output of the pulse width modulated drive circuitry 28 to shutdown motor 54.

Rectifier 38 is connected to receive single phase alternating current input through an input electromagnetic interference filter 37. In the preferred embodiment, the input power is 230V single phase 60 Hz power. The output of rectifier 38 is connected to the motor drive switching bridge circuit 50 across a filter capacitor 47, the ground fault detection circuit 31 coil and the current limiting measurement resistor 51. The output of the motor drive switching bridge circuit on lines 64, 66 and 68 are the three phase power lines for the motor 54. The motor drive switching bridge circuit 50 then modulates the output of the rectifier 38 in accordance with the signals from the pulse width modulated drive 28 to provide this three phase power. Motor 54 is connected to drive compressor 56. Compressor 56 circulates a refrigerant gas through piping schematically illustrated as line 72 to a coil 74 to provide cooling. The refrigeration coil 74 is connected to ducting 78 and a blower 76. The blower 76 circulates air through the ducting 78 and coil 74 into an are 80 to be cooled.

In accordance with this invention, the thermostat 10 provides a signal to control voltage circuitry 12 indicating the temperature of the area 80 to be cooled which in turn controls the speed of motor 54 to control compressor 6 to control the amount of refrigerant circulated through coil 74 for regulating the cooling of the area 80.

Figure 2:
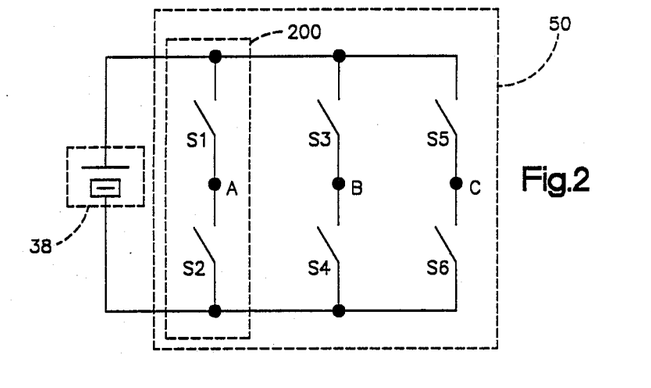
FIG. 2 is a schematic diagram of the rectifier and switching bridge.
Figure 3:
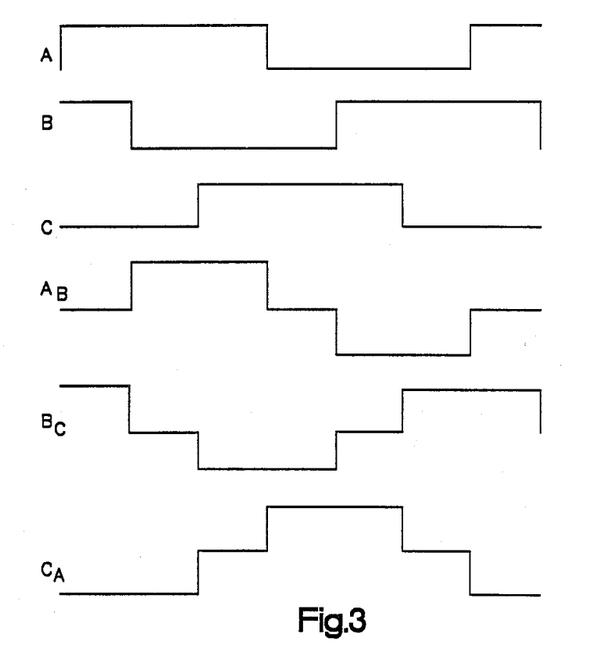
FIG. 3 is an illustration of the phase waveform signals output from the switching bridge.

FIG. 2 symbolically illustrates the rectifier 38 and motor drive switching BRIDGE CIRCUIT 50. Rectifier 38 produces a DC voltage that is input to the motor drive switching BRIDGE CIRCUIT which is represented as three parallel dual serial switches as shown to produce power on three nodes marked A, B and C representing the three phase power input to the motor 54 of FIG. 1. One section including switches S1 and S2 for node A is denoted as block 200. In accordance with the three phase operation, the voltage output on node A is represented by curve A of FIG. 3 representing the phase A output. Likewise, the voltage output on node B and node C are represented as curves B and C. The phase to phase relation is shown by curves AB and BC and CA in FIG. 3 to show the generation of a pseudo square wave between the respective phases. Therefore, the operation of switches S1 and S2 of section 200 in FIG. 2 is to produce the voltage output waveform of node A as illustrated in FIG. 3.

Figure 4:
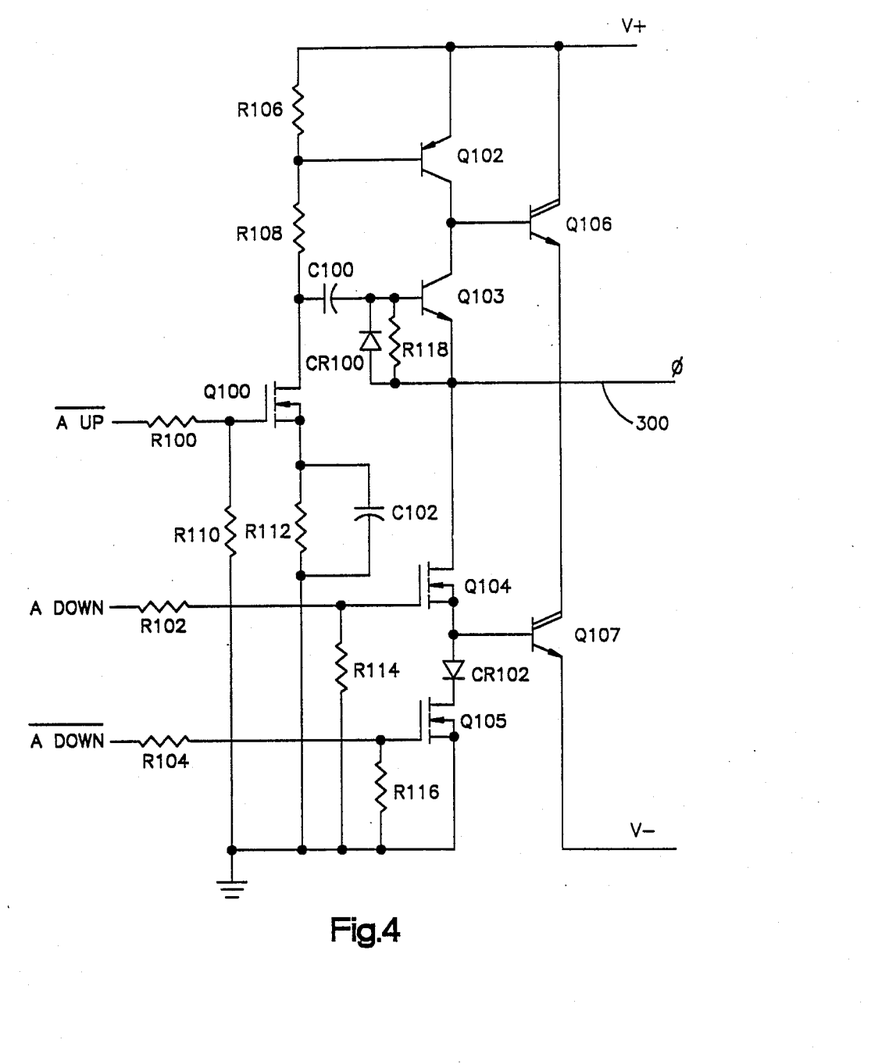
FIG. 4 is a schematic diagram of a single stage of the switching bridge.

The actual schematic for the section 200 is illustrated in FIG. 4. FIG. 4 illustrates the schematic of a circuit having three inputs, AUP-, ADOWN and ADOWN-. These three input signals are input to control transistors Q100, Q102, Q103, Q104 and Q105 to control the switching power transistors Q106 and Q107 which are symbolically shown as switches S1 and S2 in FIG. 2. The switching transistors Q106 and Q107 provide the voltage shown. Control transistor Q102 is provided to insure that switching transistor Q106 achieves saturation quickly. Likewise, Q104 is provided to insure that switching transistor Q107 achieves saturation quickly. Switching transistors Q103 and Q105 are provided to quickly drain the base current of Q106 and Q107 respectively to insure that the transistors quickly turnoff. The output is input to the overcurrent shutdown circuit 36. It should be understood that the output across V+ and V− is one phase of three phases that are input to the motor 54 of FIG. 1.

Since the motor 54 is a constant torque motor, variations in the AC frequency output to the motor across the three phases will result in variations in speed. It is an object of the motor speed control circuitry to provide control of the motor in response to the thermostat voltage input to vary the motor speed and thus vary the cooling capability of the compressor to conform with the environmental conditions in accordance with the thermostat setting.

MOTOR SPEED CONTROL

Figure 5:
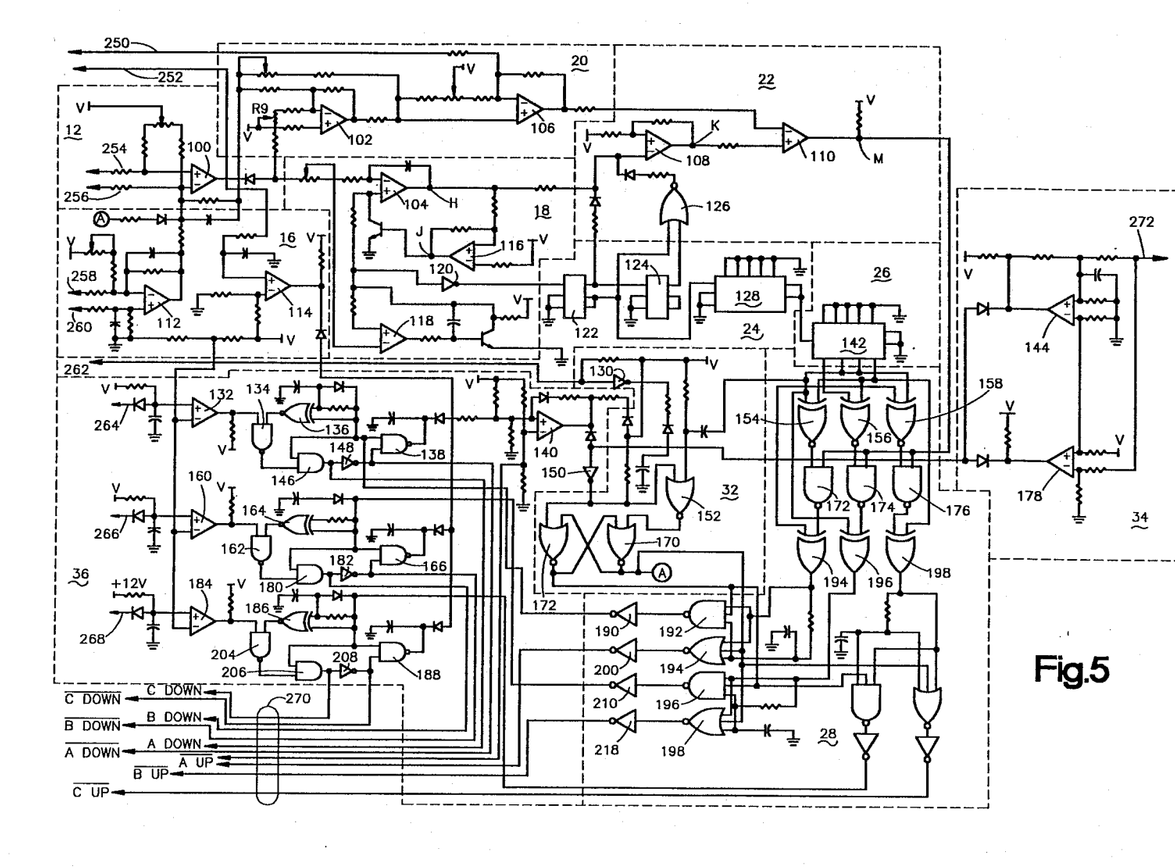
FIG. 5 is a schematic diagram of the motor drive control circuitry.

FIG. 5 illustrates a schematic diagram of the motor speed control II of FIG. 1. The following description of the motor speed control incorporates by reference the disclosure of U.S. Pat. No. 3,919,610. The schematic diagram of FIG. 5 is divided into sections that correspond to the blocks of FIG. 1. Specifically, the input from the thermostat 10 occurs on lines 254 and 256 of the voltage control 12 and are input into an operational amplifier 100 to provide the DC voltage reference input to the voltage controlled oscillator 18. Additionally, this reference voltage is input to the reference and boost voltage circuit 20 through an operational amplifier 102 that provides the boost voltage signal from variable resistor R9 adjusted to provide the initial boost voltage to the motor for start-up and the reference voltage signal that is combined with a voltage regulation signal on line 250 from the rectifier circuit to provide the output through operational amplifier 106 which is then input to the comparator 22.

The voltage controlled oscillator circuit 18 receives the input through operational amplifier 104 and provides an output on node H that is a triangular waveform. The output of operational amplifier 116 on node J is a square wave. The frequency of the triangular waveform and square wave are the same but together vary in frequency in accordance with the input control voltage signal. The square wave is provided to the latch 122 and latch 124 through NOR gate 126 to provide an input to operational amplifier 108 with the triangular waveform of node H. The output of operational amplifier 108 on node K resembles the voltage waveform labeled VREF in FIG. 6. This waveform is then compared in comparator 110 with the reference voltage output of the reference and boost voltage circuit 20 to result in a waveform at node M.

Figure 6:
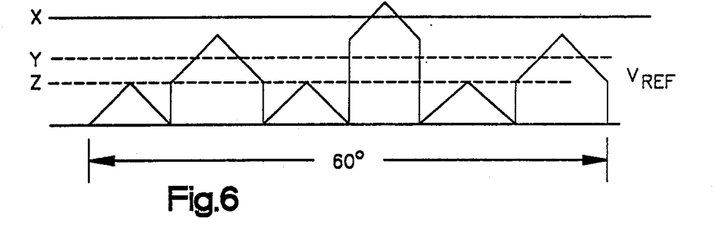
FIG. 6 is an illustration of the waveform signals input to the comparator.
Figure 7:
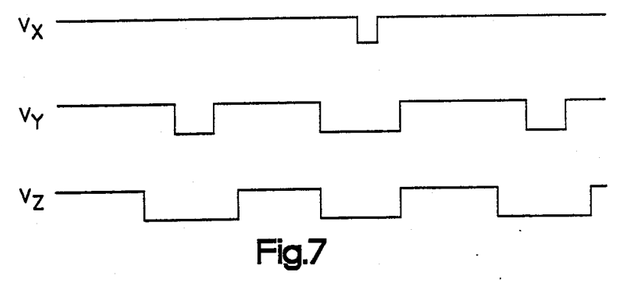
FIG. 7 is an illustration of the waveform signals output from the comparator.

FIG. 7 illustrates three waveforms at node M for three different reference voltages X, Y and Z illustrated in FIG. 6. The waveform in FIG. 6 is produced over a 60 degree interval that will be superimposed on the three phase power output to the motor to regulate the motor speed.

The output of the voltage oscillator section 18 and specifically the square wave output of node J and through latch 122 is input to a counter 128 (which in the preferred embodiment is a CD 4018) for frequency modulation control to produce a signal that will be divided by 6 in the divide by 6 circuitry 26 and counter 142 to produce a three phase output voltage reference signal.

Figure 8:
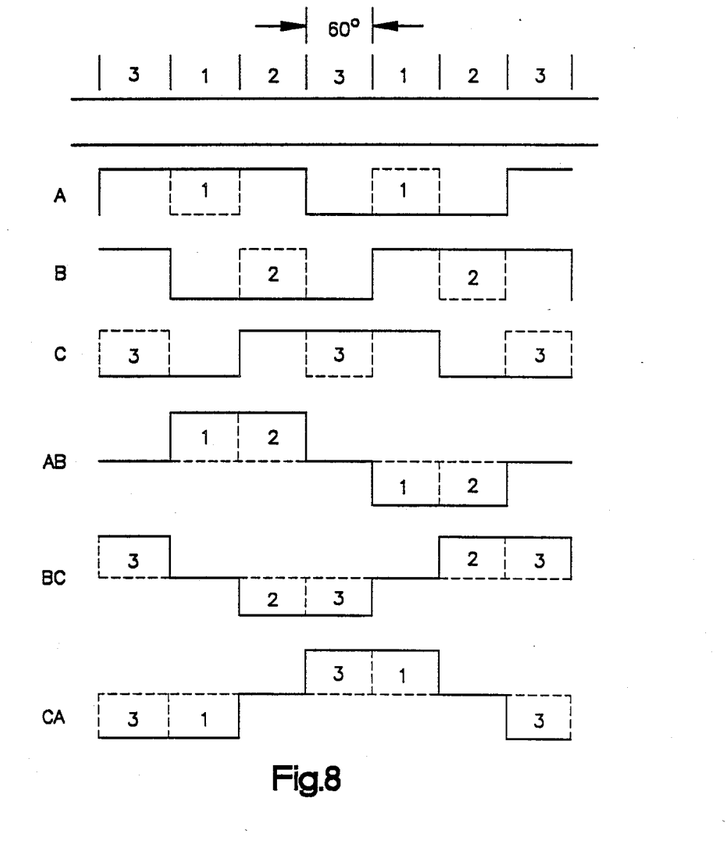
FIG. 8 is an illustration of the phase waveform signals output from the motor control circuitry including the zones containing speed control information.

FIG. 8 illustrates the three phase output signals A, B and C which without any speed control signaling would be the outputs of the motor drive switching bridge circuit 50 of FIG. 1. The waveform of A, B and C in FIG. 8 are divided up into 60 degree wide zones labeled 1, 2 and 3 with the top line of the figure defining the different zone areas.

The zone areas for the phase waveforms A, B and C and for the phase to phase waveform combinations AB, BC and CA denote where the speed control voltage waveforms within their respective zones such as those in FIG. 7 would be placed.

Figure 9:
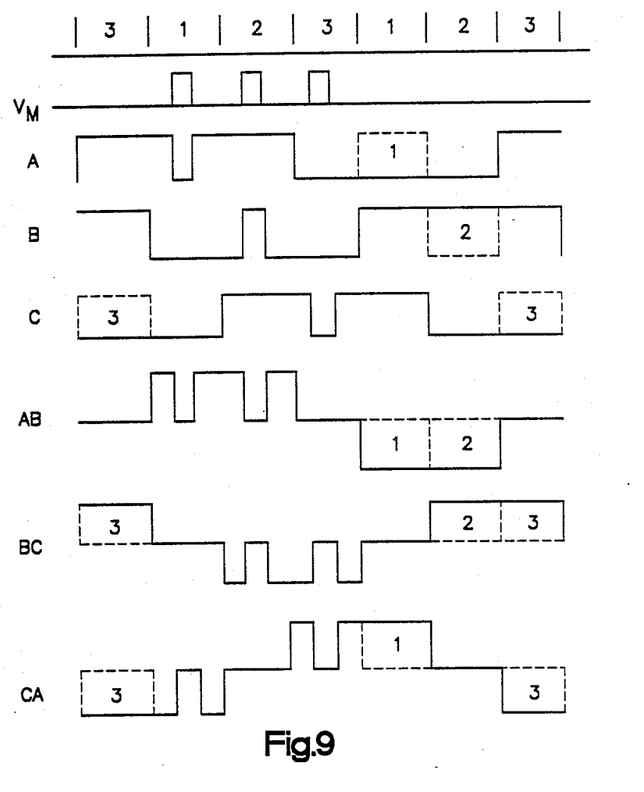
FIG. 9 is an illustration of the phase waveform signals output from the speed control circuitry including examples of speed control information superimposed thereon.

FIG. 9 illustrates the voltage speed control waveform output VM imposed in the respective zones for phase waveforms A, B and C and the phase to phase waveforms AB, BC and CA. The phase waveforms A, B and C would be output from the pulse width modulated drive circuit 28 in NAND gates 172, 174, 176 and the OR gates 194, 196 and 198 to provide the outputs to drive the motor drive switching bridge circuit.

The speed control circuit of FIG. 5 further includes the overcurrent shutdown circuit 36 that is connected to the reset latch 32 containing the latched NOR gates 168 and 170. The inputs to the overcurrent shutdown circuits 264, 266 and 268 are connected to the motor drive switching bridge circuit at line 300 of FIG. 4 for the A, B and C phases. When an overcurrent condition is detected latch 32 receives an input which shuts down the output of the pulse width modulated drive circuit 28 through the NOR gates 202, 216 and 220 and NAND gates 192, 212 and 214.

The input to the current limit circuitry on lines 258 and 260 from the rectifier circuit are used to determine the presence of an excessive current and which results in an input to reset latch 32 again causing a shutoff of the pulse width modulated drive circuit 28 output at NOR gates 202 and 220 and NAND gates 192 and 212.

The overvoltage/undervoltage shutdown circuit 34 is connected to the rectifier circuit 38 by line 272 to detect an overvoltage or undervoltage output from the rectifier. The overvoltage/undervoltage shutdown circuit 34 is configured to have a hysterisis or overvoltage and undervoltage operating range to permit small variations in the rectifier voltage output without shutting down the system. The output of the overvoltage/undervoltage circuit 34 is input to the reset latch 32 which again will shutdown the output of the pulse width modulated drive circuit 28 when an overvoltage o undervoltage condition is detected.

The reset latch 32 also receives an input on line 252 which is a ground fault detection line that is connected to the rectifier circuit. This ground fault detection line will indicate the presence of a ground fault between the rectifier circuit 38 and the motor drive switching bridge circuit 50.

Line 262 provides the external reset to the latch 32 to reset the latch after the latch has detected a fault condition causing a shutdown of the output of the pulse width modulated drive.

Although preferred embodiments of the invention have been described in detail, it is to be understood that various changes, substitutions and alterations can be made therein without departing from the spirit of the invention as defined by the appended claims.

What is claimed is:

1. A compressor drive system comprising:
   rectifier means for converting externally supplied single phase alternating current into direct current as an output;
   temperature sensing means for producing a signal indicating ambient air temperature;
   modulation control means for receiving the temperature signal and producing multiphase power and speed control signals;
   motor drive switching bridge circuit means for modulating the rectifier output in accordance with the multiphase power and control output signals and producing multiphase power output at a voltage level and at a frequency in response thereto; and
   a motor connected to receive the multiphase power output from the bridge circuit means and connected to drive an air conditioner compressor at a speed in accordance with the temperature signal.

2. A compressor drive system according to claim 1 wherein said modulation control means further includes current limiting circuit means connected to receive a current signal indicating the rectifier current output for modulating the speed control and multiphase power signals in response thereto.

3. A compressor drive system according to claim 1 wherein said modulation control means further includes a voltage regulation means connected to the voltage output of the rectifier for modulating the speed control signal in response thereto.

4. A compressor drive system according to claim 1 wherein said modulation control means further includes fault detection means for inhibiting the production of the multiphase power and speed control signals in the presence of a fault condition within the system.

5. A compressor drive system according to claim 4 wherein said fault detection means further includes a shutdown latch to prohibit the output of the multiphase power and speed control signals until reset by an external reset signal.

6. A compressor drive system comprising:
   rectifier means for converting externally supplied single phase alternating current into direct current as an output;

temperature sensing means for producing a signal indicating ambient air temperature;

control voltage means for receiving the temperature signal and producing a motor speed signal in response thereto;

oscillator means for receiving the speed signal and producing first and second waveform signals in response thereto;

frequency modulation circuit means for receiving the first waveform signal and producing a third waveform signal and multiphase power signals;

comparator means for combining the second and third waveform signals and the speed signal to produce a speed control waveform signal;

modulation circuit means for combining the multiphase power signals with the speed control waveform to produce multiphase modulated power control signals;

a motor drive switching bridge circuit means connected to the rectifier output for receiving the multiphase modulated power control signals and producing multiphase power output in response thereto; and a motor connected to receive the multiphase power output for driving an air conditioner compressor at a speed in accordance with the temperature signal.

7. A compressor drive system according to claim 6 wherein said control voltage means further includes a current limiting circuit for receiving a current signal indicating the rectifier current output for modulating the motor speed signal in response to the current output from the rectifier.

8. A compressor drive system according to claim 6 wherein said comparator means further includes a voltage regulation circuit for receiving a signal indicating the voltage output from the rectifier and modulating the speed signal in response thereto.

9. A compressor drive system according to claim 6 wherein said control voltage means further includes circuit means to provide an initial start voltage signal providing an increased power output from the motor drive switching bridge circuit to start the motor.

10. A compressor drive system according to claim 6 and further including fault detection means connected to the modulation circuit means for prohibiting the production of the multiphase modulated power control signals in the presence of a fault condition.

11. A compressor drive system according to claim 10 wherein said fault detection means further includes a latch that is set upon the occurrence of a fault condition resulting in the inhibiting of the production of multiphase modulated power control signals until reset by an external reset signal.

12. A compressor drive system according to claim 10 wherein the fault detection means further includes an overcurrent circuit means for setting the fault detection latch when the current output from the motor drive switching bridge circuit means exceeds a predetermined value.

13. A compressor drive system according to claim 10 wherein said fault detection means further includes an undervoltage/overvoltage detection circuit for providing an input to the fault detection latch when the voltage output from the rectifier exceeds a first voltage value or is less than a second voltage value.

14. A compressor drive system according to claim 10 wherein said fault detection means further includes a ground fault circuit means for detecting excessive current output from the rectifier means and for providing an input to the fault detection latch and response thereto.

15. A compressor drive system according to claim 6 wherein the rectifier means further includes an input filter to reduce any electromagnetic interference from the externally supplied alternating current input.

16. An air conditioner comprising:

a compressor for pressurizing a refrigeration gas;

a refrigeration coil connected to the compressor for depressurizing the refrigeration gas to provide cooling;

a blower means for circulating air through the refrigeration coil and into an area to be cooled;

a rectifier means for converting externally supplied single phase alternating current into direct current as an output;

temperature sensing means for producing a signal indicating ambient air temperature of the area to be cooled;

control voltage means for receiving the temperature signal and producing a motor speed signal in response thereto;

a reference voltage circuit connected to receive the motor speed signal and a reference voltage signal indicating voltage output from the rectifier means and providing a modified motor speed signal in response thereto;

oscillator means for receiving the speed signal and producing first and second waveform signals in response thereto;

frequency modulation circuit means for receiving the first waveform signal and producing a third waveform signal and multiphase power signals;

comparator means for combining the second and third waveform signals and the modified motor speed signal to produce a speed control waveform signal;

modulation circuit means for combining the multiphase power signals with the speed control waveform to produce multiphase modulated power control signals;

a motor drive switching bridge circuit means connected to the rectifier output and for receiving the multiphase modulated power control signals and producing multiphase power output;

fault detection means connected to the rectifier means and the motor drive switching bridge circuit means for inhibiting the production of the multiphase modulated power control signals upon the occurrence of a fault condition; and a motor connected to receive the multiphase power output for driving the compressor at a speed in accordance with the temperature signal.

* * * * *